United States Patent
Gallet et al.

(10) Patent No.: US 7,887,959 B2
(45) Date of Patent: Feb. 15, 2011

(54) FUEL CELL MODULE WITH FLEXIBLE INTERCONNECTS

(75) Inventors: Damien Gallet, Avignon (FR); Jean-Luc Sarro, Bourg Saint Andeol (FR); Franck Blein, St Avertin (FR)

(73) Assignee: Commissariat a l'Energie Atomique (FR)

( * ) Notice: Subject to any disclaimer, the term of this patent is extended or adjusted under 35 U.S.C. 154(b) by 960 days.

(21) Appl. No.: 11/666,273

(22) PCT Filed: Oct. 26, 2005

(86) PCT No.: PCT/FR2005/050905

§ 371 (c)(1),
(2), (4) Date: Apr. 25, 2007

(87) PCT Pub. No.: WO2006/048573

PCT Pub. Date: May 11, 2006

(65) Prior Publication Data

US 2009/0130528 A1 May 21, 2009

(30) Foreign Application Priority Data

Nov. 2, 2004 (FR) .................................. 04 52496

(51) Int. Cl.
*H01M 2/00* (2006.01)
(52) U.S. Cl. ...................................... 429/410; 429/497
(58) Field of Classification Search .................. 429/12, 429/13, 31, 32, 410, 497, 483, 484, 485, 429/492
See application file for complete search history.

(56) References Cited

U.S. PATENT DOCUMENTS

2005/0037252 A1 * 2/2005 Pham ........................ 429/31

FOREIGN PATENT DOCUMENTS

| JP | 63129845 | 5/1988 |
|---|---|---|
| JP | 63225164 | 9/1988 |
| JP | 01 267964 | 10/1989 |
| JP | 01 298647 | 12/1989 |
| JP | 02 192665 | 7/1990 |
| JP | 04303680 | 11/1992 |
| JP | 06206052 | 8/1994 |
| WO | WO 2004/093235 A | 10/2004 |

OTHER PUBLICATIONS

International Search Report which issued in PCT/FR05/050911, citing the above references.
Search Report PCT/FR2005/050905 Oct. 26-31, 2005 in French.

* cited by examiner

*Primary Examiner*—Jennifer Michener
*Assistant Examiner*—Monique Wills
(74) *Attorney, Agent, or Firm*—Baker & Hostetler LLP

(57) ABSTRACT

A fuel cell module according to the invention, of concentric type, can consist of parts fabricated independently of each other whilst ensuring efficient electric connection between these parts and the limiting of stresses inside the stack.

It chiefly consists of a central stack (20) of several elementary cells of a fuel cell, separated from each other by interconnects (10). These are formed of a central metal partition carrying flexible, notched collars. The assembly is completed by a base (50) and flange (40) ensuring distribution of the combustible gases.

Application to fuel cells of SOFC type.

10 Claims, 4 Drawing Sheets

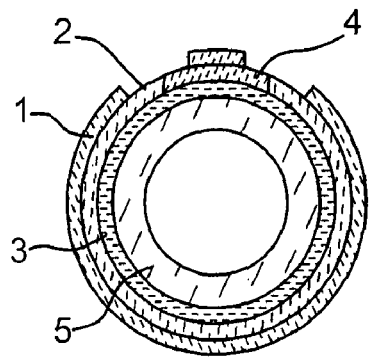
FIG. 1.A
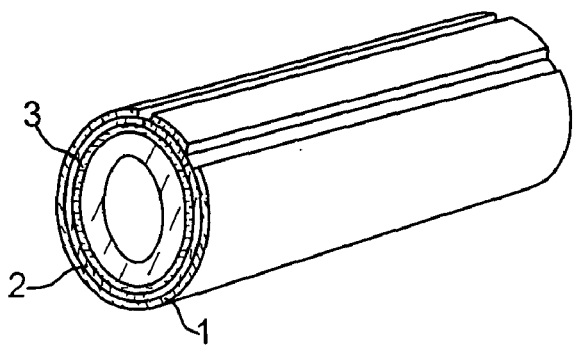
FIG. 1.B
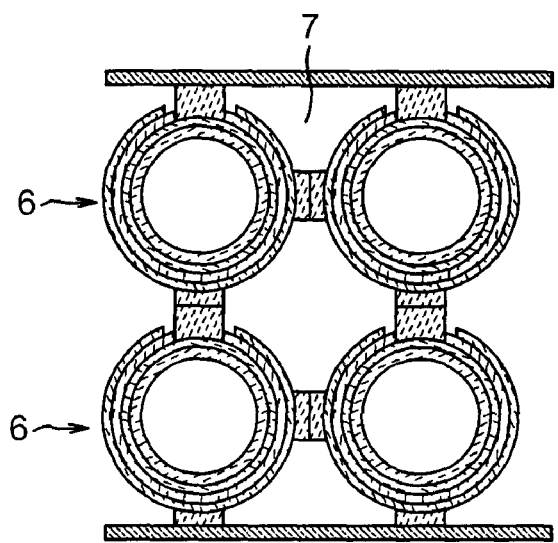
FIG. 1.C

FUEL CELL MODULE WITH FLEXIBLE INTERCONNECTS

FIELD OF THE INVENTION

The invention relates to fuel cells and in particular those operating at high temperature and of Solid Oxide Fuel Cell type (SOFC), but may also apply to other fuel cell families and to electrolysers.

PRIOR ART AND PROBLEM RAISED

Fuel cells of SOFC type operate with oxygen and hydrogen as fuel, or another combustible gas e.g. of methane type, and at a temperature of between 500 and 1000° C. These cells consist of a stack of several elementary cells joined by connecting elements such as interconnects or bipolar plates. The elementary cells are formed of a stack of a cathode, an electrolyte and an anode. The high temperature is necessary to obtain sufficient $O^{2-}$ ion conductivity of the electrolyte.

Several types of architecture govern the design of these fuel cells; they are divided into four main types as follows:
  tubular architecture
  monolithic architecture
  strip architecture
  planar architecture.

With reference to FIGS. 1A, 1B and 1C, the tubular architecture is widely known. It is in the form of a tube, which may or may not be closed at one end (see FIG. 1B). As shown in FIG. 1C, several cells 6 are placed inside a chamber 7 and are connected in series and/or in parallel. Oxygen is injected by means of an inner tube at the bottom of each cell and moves along a cathode 3, passing through a support tube 5 on which it is positioned. The second fuel is injected outside the cell in the main chamber 7 and is therefore in contact with an anode 1 located on the outer surface of an electrolyte 2, itself of tubular shape since it is positioned on the cathode. The cathode is joined to a connector 4 also placed on the outer surface of the electrolyte 2. The residual gases evacuate and are optionally mixed in a combustion chamber to allow preheating of the first incoming gas.

In said configuration, there is no sealing which requires any management. The mechanical resistance of the cell is ensured by the support tube which is porous so that the oxygen is able to pass through it and diffuse towards the cathode. It was later contemplated to do away with this support tube, leaving the cathode to ensure the mechanical resistance of the assembly.

Once connected together in series, the cells enable the desired voltage to be obtained between current collector plates. The connection of the cells in FIG. 1C is in parallel, and allows the desired power to be obtained.

Several drawbacks are associated with this tubular structure, which are the following:
  the current lines are long, since the current must pass longitudinally (see FIG. 1C) through the half-tubes; ohmic losses are therefore high;
  fabrication of the tubes is complex and costly;
  volume efficiency is low, having regard to the lost space between the cells; and
  the heat gradient in the length of the tubes, due to exhausting of the reactant gases, is highly detrimental to the mechanical resistance thereof.

Several techniques are used to improve the mechanical resistance of this tubular structure, these being:
  reducing the size of the tubes to reduce stresses;
  reducing the heat gradient by injecting the gases at different levels; and
  reinforcing the support tube.

Also, a reduction in the length of the current lines can be obtained by:
  reducing the internal resistance of the fuel cell, which implies higher power;
  reducing losses through polarisation in the electrodes by thinning the anode, made possible by the presence of bridges;
  improving compactness through a flattened cylindrical shape; and
  doing away with the air supply tube.

However, all these architectures only partly solve the main drawbacks which are poor compactness and high ohmic losses due to the length of the current lines.

The planar architecture is widely used. The stack, hence planar, consists of two bipolar plates sandwiching a stack consisting successively of an anode, an electrolyte and a cathode. The bipolar plates acts as connectors and also have circulation channels oriented perpendicularly for example to organize cross flow of the two fuels. The supply and exhausting of gases is made by means of manifolds arranged on the four side faces of the stack.

The current lines are reduced since the current only has to pass through the thickness of the layers. In addition, the compactness of this structure imparts a definite advantage. On the other hand, sealing problems are greater than with the tubular architecture, and have to be managed on the four side faces of the stack of cells in order to ensure the pathway of each of the gases between the inlet and outlet phases, and their separation. This is due to the fact that the electrodes are porous. Also, sealing must be ensured on the periphery of the four manifolds.

With reference to FIG. 1, a more recent architectural concept has a coaxial geometry which combines the advantages of the planar structure with those of the tubular structure. It is highly compact, ohmic losses are much reduced and it offers ease of implementation regarding the sealing of the assembly. The module shown in this FIG. 1 is the stacking of several elementary cells of fuel cells. Each elementary cell is sandwiched between two concentric interconnects 4 and successively consists of an anode 1, an electrolyte 2 and a cathode 3. With the exception of the end interconnects 4, the others are common to two adjacent elementary cells. Said stacking is completed by two distributor manifolds for combustible gases positioned at the two ends (not shown in this figure).

However, the material currently used to form said interconnects 4 is a ceramic of lanthanum chromite type, which is very costly. Additionally, interconnects of this type are often deposited by plasma spraying, during a single spray series of the different successive layers forming each elementary cell. However, it is envisaged to fabricate independently the different constituent elements of this type of fuel cell, whilst maintaining this coaxial architecture. More precisely, it is essential to allow the assembly of the different coaxial elementary cells, namely a stack formed of an anode, an electrolyte and a cathode, to be fabricated independently of each other. Also it is essential to be able to ensure the electric connection of these cells in series, and to allow the flow and separation of the combustible gases. Finally, it is always sought to limit mechanical stresses on the different elementary cells, containing greater or lesser quantities of ceramic, and which are in both hot and cold contact.

The purpose of the invention is therefore to overcome these disadvantages by proposing a different design for the interconnects of this type of fuel cell module.

SUMMARY OF THE INVENTION

For this purpose, the first main subject-matter of the invention is a fuel cell module formed of elementary cells having tubular geometry, each cell consisting of a concentric-based stack comprising an anode, an electrolyte and a cathode, and surrounded by two interconnects, the module consisting of a concentric stack of several concentric cells and completed on each side by a device for distributing and exhausting combustible gases, namely a flange and a base.

With a view to imparting elasticity to the interconnects allowing radial deformation of the assembly, these interconnects are provided with a central partition on which at least one flexible, notched, metal collar is flanged which lies away from the partition and at an angle to it.

In the main embodiment, it is provided that the section of the module is cylindrical.

Also, provision is made so that the distributor manifolds have supply means for combustible gases of two types.

In one main embodiment of the base, provision is made for the supply means to comprise at least two radial channels opening into the side of the base, and onto one face of the stack, via distributing orifices intended to supply the electrodes of the elementary cells.

Said module can be completed by the use of strips of ceramic wool on the side of the cathode between the collars and the central partition of the interconnects, and by strips of nickel felt on the side of the anode.

LIST OF FIGURES

The invention, its different characteristics and embodiments will be better understood on reading the following detailed description, which is accompanied by several figures respectively showing:

FIGS. 1A, 1B and 1C, a first type of basic structure for fuel cells according to the prior art;

DETAILED DESCRIPTION OF ONE EMBODIMENT OF THE INVENTION

Figure 3:
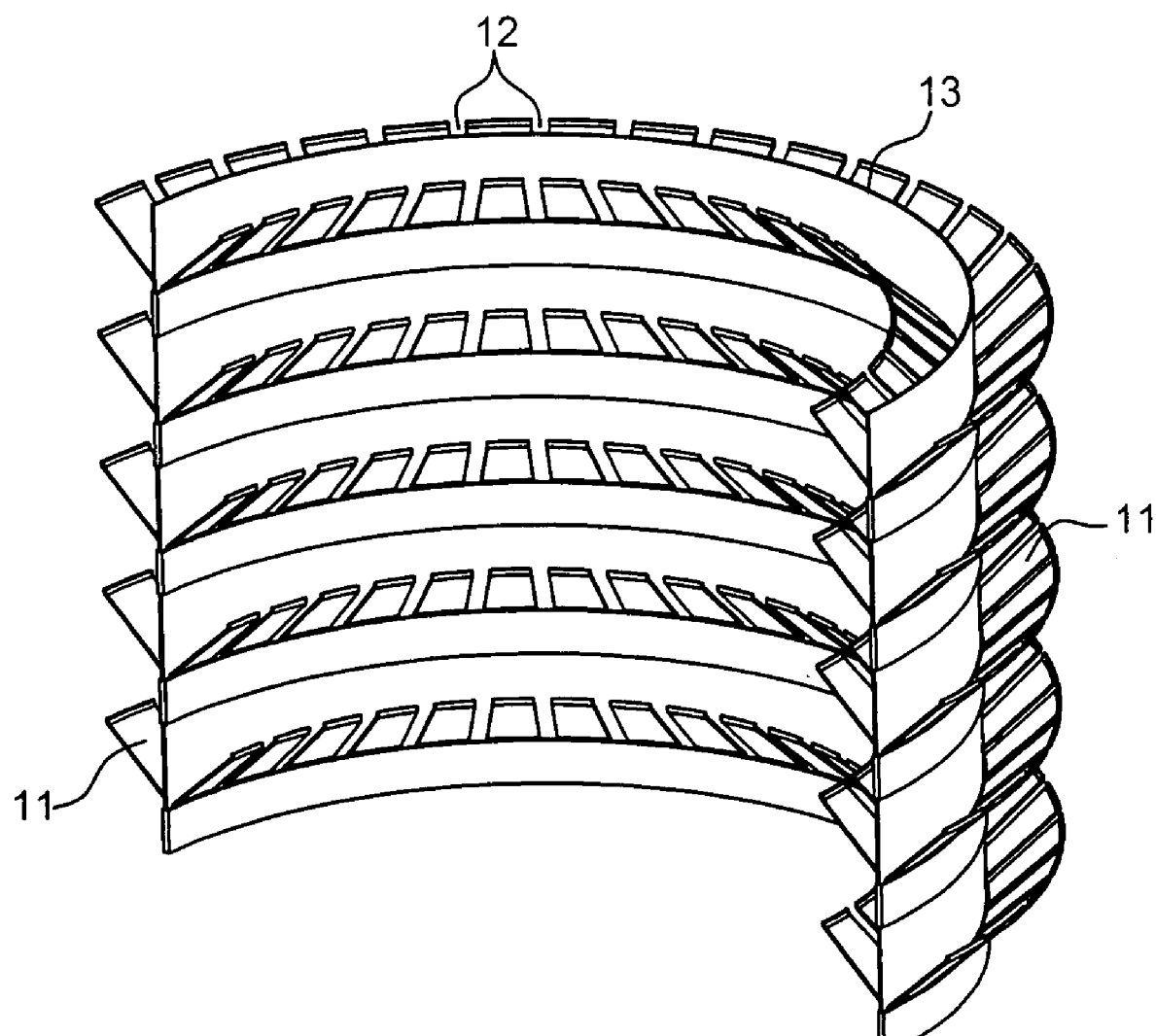
FIG. 3 is a high viewpoint perspective of one half of an interconnect used in the module according to the invention.

FIG. 3 shows one half of an interconnect used between two elementary cells in the fuel cell module of the invention. Its structure mainly consists of a central partition 13 consisting of a planar metal plate shaped into a semi-cylinder, by rolling or profiling. On each of its faces, spaced apart collars 11 are flanged so as to project outwardly from either side of the sealed partition 13 at an angle, and at all events not perpendicular to it. Also, each collar 11 has notches 12 at its ends, forming strips. In cooperation with the more or less elastic nature of the metal plate forming each flanged collar 11, the notches 12 enable the collars 11 to have elasticity in the radial direction, of which use is made for assembly of the module. Also, this elasticity enables each interconnect to ensure electric contact with the electrodes with which it is in contact. In this way, clearances can be adjusted at the time of assembly of the module to permit this assembly and to ensure electric contact between the different elements, in particular when hot. Additionally, this type of interconnect makes it possible to limit stresses on the elementary cells of the module during thermal expansion.

It is envisaged to use a nickel-based alloy or a superalloy to form the interconnects. Their dimensions when cold are determined so as to obtain sufficient force on the adjacent electrodes in order to ensure good electric contact via the strips formed by each notch 12, without any risk of strip creep and without any risk of damaging the elementary cells of the module, and in order to equilibrate the forces under heat on each elementary cell.

To limit any problem related to corrosion of the interconnect contacts, these may be coated on the cathode side with the same material as the cathode or any other material ensuring this function. Also, to limit electronic losses at the interface of these two elements, a screen can be laid on the cathode or it can be given a conductive metal coating.

Figure 4:
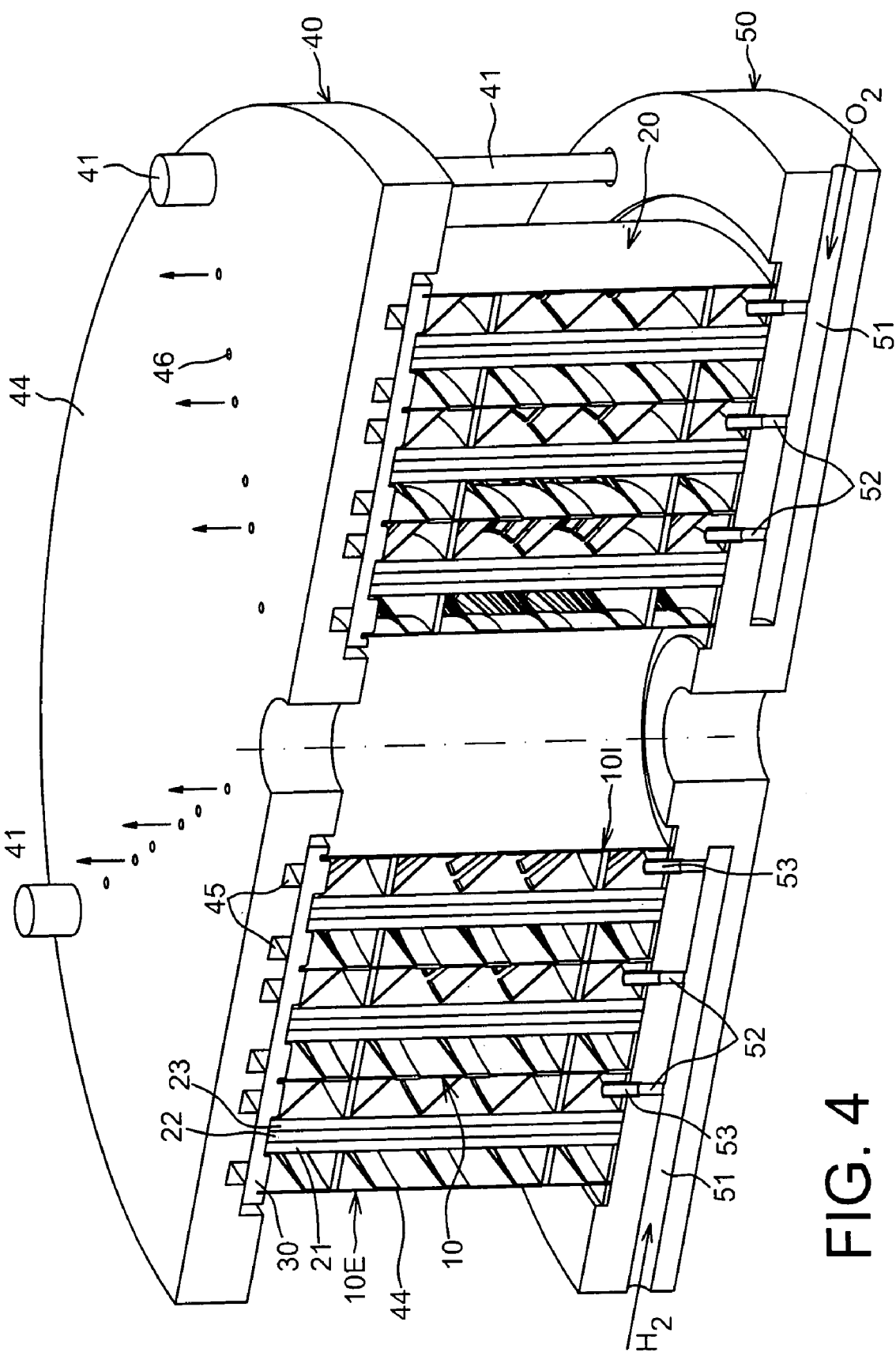
FIG. 4 is a cross-sectional, high viewpoint perspective of a module according to the invention.

With reference to FIG. 4, the module of the invention comprises the following elements: a base 50 on which a stack 20 is positioned which will be detailed below, surmounted by a flange 40. The flange 40 and base 50 form distributor and exhaust devices comprising gas supply and gas evacuation means.

The base 50 has two radial channels 51 respectively receiving the two gases, namely hydrogen and oxygen under air pressure. Distribution orifices 52 opening into these two radial channels 51 also end opposite the module 20. Therefore the two gases can be distributed towards each elementary cell.

A seal, for example of glass seal type, is deposited on the upper surface of the base 50 in order to ensure a seal at this level. Metal capillary tubes 53 are fitted into the distribution orifices 52 to prevent them from being clogged with glass during depositing of the glass.

The lower surface of the stack 20 is in contact with the seal deposited on the upper surface of the base 50.

Figure 2:
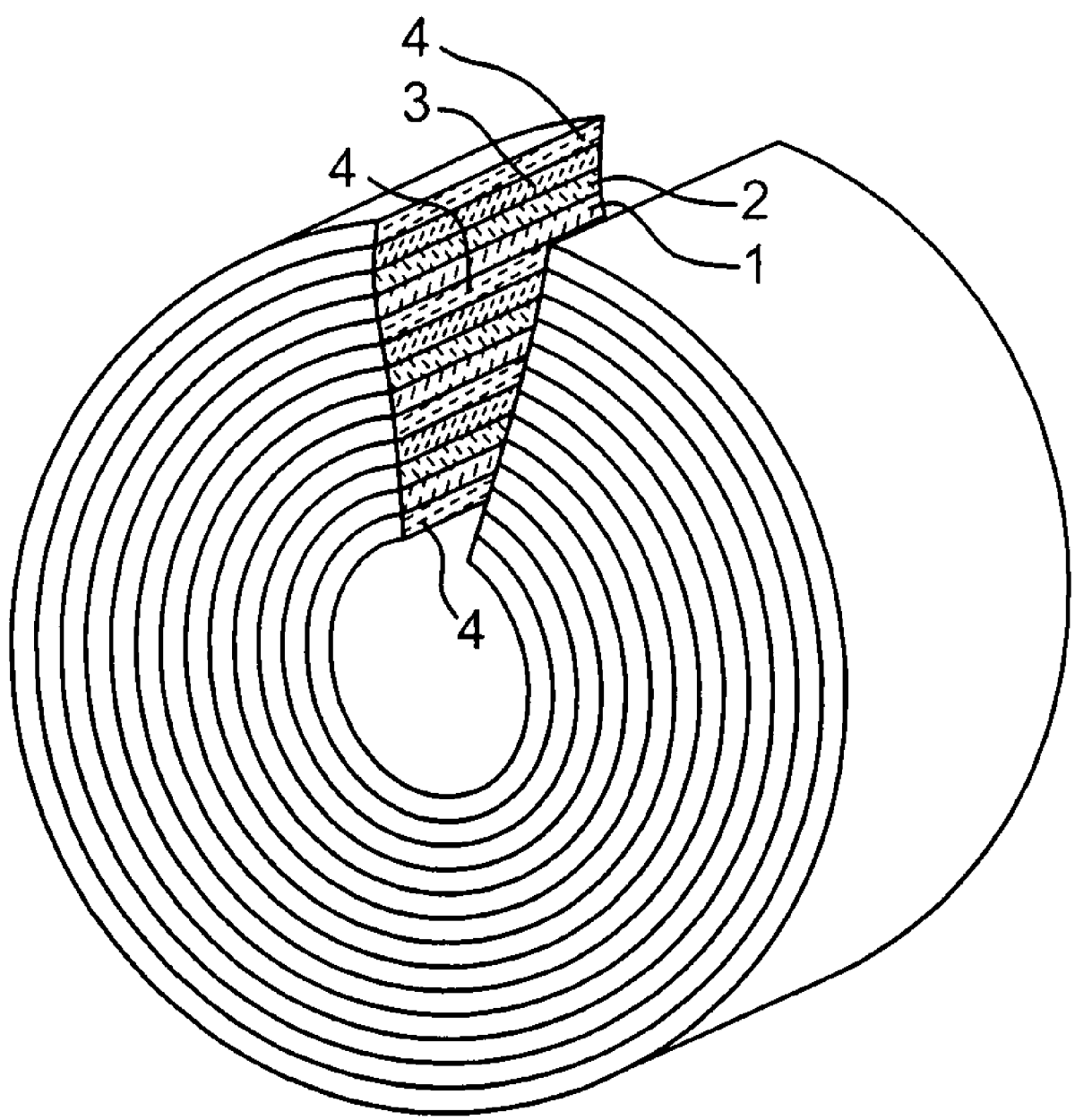
FIG. 2 is a partial, high viewpoint perspective of a stacking structure type for a module with coaxial geometry.

The stack 20 of elementary cells of the fuel cell therefore has a concentric structure such as described FIG. 2. However, the interconnects such as described FIG. 2 are used between the elementary cells. This module 20, on its periphery, effectively consists of an external interconnect 10E, and in its centre of an internal interconnect 10I. Each of these two interconnects 10E and 10I is in contact with an elementary cell itself comprising a stack of an anode 21, an electrolyte 22 and a cathode 23. The other interconnects 10 are positioned between two adjacent elementary cells.

It is to be noted that the distributing orifices 52 of the base 50 lead into the free spaces between interconnects 10E and 10I and the elementary cells.

It can therefore be ascertained that the interconnects 10, 10E and 10I ensure the functions of electric contacts and the separating of the two combustible gases.

If it is not desired to multiply the number of supply orifices 52 and their capillary tube 53, it is most advantageous, between each cathode 23 and the interconnect 10, 10I facing it, to arrange a ceramic felt or wool. Similarly, between each anode 21 and the interconnect 10E, 10 facing it, it is possible to arrange a nickel felt in order to create a charge loss. Therefore the combustible gases will be able to distribute themselves uniformly over the circumference of the anode 21 and cathode 23 without it being necessary to multiply the number of combustible gas supply points.

Between the upper surface of the stack 20 and the lower surface of the flange 40 a disk of ceramic wool 30 is inserted which, once compressed absorbs the differences in expansion, creates a sufficient charge loss in order to ensure relative sealing in the spaces between the interconnects 10, 10E and 10I and the elementary cells. Finally it prevents return of residual gases inside the stack 20.

The flange 40 is designed in zirconium. It comprises annular chambers 45 machined in its lower surface for the purpose of collecting residual gases independently so as to channel them outwards or towards another fuel cell module. A second option consists of burning these residual gases at the outlet of the module, in order to heat the circuits of incoming combustible gases. For example a fibrous material e.g. ceramic wool may be arranged in the residual gas outlets of the flange 40, to evacuate these gases without any flame back-flow inside the module. The other solution consists of allowing these residual gases to escape via outlet orifices 46 which connect the annular channels 45 to the upper surface 44 of the flange 40.

The entire module is held together by stay rods 41 which clamp the flange 40 down towards the base 50, the stack 20 being sandwiched in between.

Collecting of electric current is made at the terminals of the module i.e. on the internal 10I and external 10E interconnects.

The invention claimed is:

1. Fuel cell module formed of a concentric stack (20) of elementary cells of tubular geometry having a common co-axial axis with each elementary cell consisting of an anode (21), an electrolyte (22) and a cathode (23), and being in contact with two interconnects (10, 10E, 10I), the module consisting of a concentric stack (20) of several concentric cells and several interconnects disposed in a concentric arrangement with the module completed on each side by a distribution and exhaust namely a base (50) and a flange (40) characterized in that the concentric interconnects (10, 10E, 10I) have a central partition (13) on which at least one flexible metal collar (11) is flanged to form a notch that lies at an angle away from the central partition (13).

2. Module according to claim 1 characterized in that the stack in cross section is cylindrical.

3. Module according to claim 1, characterized in that the distribution and exhaust, namely the flange (40) and base (50), have means to supply combustible gases.

4. Module according to claim 3, characterized in that the supply means of the base (50) consist of at least two radial channels (51) opening onto one face of the stack (20) via distribution orifices (52) intended to supply the electrodes, namely the anodes (21) and the cathodes (23) of the elementary cells.

5. Module according to claim 1, characterized in that it comprises strips of ceramic wool on the side of the cathodes (23) between the collars (11) and the central partition (13) of interconnects (10, 10I), and strips of nickel felt on the side of the anodes (21) between the collars (11) and the central partition (13) of interconnects (10, 10E).

6. Module according to claim 3, characterized in that the supply means of the flange (40) consist of two annular channels (45) on the surface facing the stack (20) and of outlet orifices (46) on an outer surface (44), and leading into annular channels (45) to exhaust residual gases.

7. Module according to claim 1, characterized in that it comprises a ceramic wool disk (30) compressed between the stack (20) and the flange (40).

8. Module according to claim 4, characterized in that it comprises capillary tubes (53) fitted into inlet orifices (52) of the base (50).

9. Module according to claim 1, characterized in that it comprises a seal on the upper surface of the base (50) and positioned facing the stack (20).

10. Module according to claim 1, characterized in that the collars (11), on the side of the cathodes (23), are coated with the material of which the cathodes (23) are made.

* * * * *